United States Patent
Sheets et al.

(10) Patent No.: US 8,694,315 B1
(45) Date of Patent: Apr. 8, 2014

(54) SYSTEM AND METHOD FOR AUTHENTICATION USING SPEAKER VERIFICATION TECHNIQUES AND FRAUD MODEL

(71) Applicants: John F. Sheets, San Francisco, CA (US); Kim R. Wagner, Sunnyvale, CA (US)

(72) Inventors: John F. Sheets, San Francisco, CA (US); Kim R. Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/899,470

(22) Filed: May 21, 2013

Related U.S. Application Data

(60) Provisional application No. 61/761,155, filed on Feb. 5, 2013.

(51) Int. Cl.
*G10L 17/00* (2013.01)
*G10L 17/04* (2013.01)
*G10L 17/22* (2013.01)
*G10L 17/24* (2013.01)

(52) U.S. Cl.
CPC .............. *G10L 17/04* (2013.01); *G10L 17/00* (2013.01); *G10L 17/22* (2013.01); *G10L 17/24* (2013.01)
USPC ........................................................ 704/246

(58) Field of Classification Search
CPC ......... G10L 17/00; G10L 17/04; G10L 17/22; G10L 17/24
USPC ................................................ 704/246–250
See application file for complete search history.

(56) References Cited

U.S. PATENT DOCUMENTS

| | | | | |
|---|---|---|---|---|
| 5,675,704 | A * | 10/1997 | Juang et al. | 704/246 |
| 5,719,921 | A * | 2/1998 | Vysotsky et al. | 379/88.01 |
| 5,839,103 | A * | 11/1998 | Mammone et al. | 704/232 |
| 5,995,927 | A * | 11/1999 | Li | 704/246 |
| 6,529,871 | B1 * | 3/2003 | Kanevsky et al. | 704/246 |
| 6,556,969 | B1 * | 4/2003 | Assaleh et al. | 704/256.5 |
| 6,804,647 | B1 * | 10/2004 | Heck et al. | 704/246 |
| 6,973,426 | B1 * | 12/2005 | Schier et al. | 704/246 |
| 2003/0009333 | A1 * | 1/2003 | Sharma et al. | 704/246 |
| 2003/0046072 | A1 * | 3/2003 | Ramaswamy et al. | 704/240 |

(Continued)

FOREIGN PATENT DOCUMENTS

JP 2010-191680 A 9/2010

OTHER PUBLICATIONS

U.S. Appl. No. 13/785,956, filed Mar. 5, 2013.
U.S. Appl. No. 13/899,496, filed May 21, 2013.

(Continued)

*Primary Examiner* — Jialong He
(74) *Attorney, Agent, or Firm* — Kilpatrick Townsend & Stockton LLP

(57) ABSTRACT

Embodiments of the invention provide for speaker verification on a communication device without requiring a user to go through a formal registration process with the issuer or network. Certain embodiments allow the use of a captured voice sample attempting to reproduce a word string having a random element to authenticate the user. Authentication of the user is based on both a match score indicating how closely the captured voice samples match to previously stored voice samples of the user and a pass or fail response indicating whether the voice sample is an accurate reproduction of the word string. The processing network maintains a history of the authenticated transactions and voice samples.

22 Claims, 10 Drawing Sheets

(56) References Cited

U.S. PATENT DOCUMENTS

| | | | |
|---|---|---|---|
| 2004/0107099 A1* | 6/2004 | Charlet | 704/234 |
| 2004/0162726 A1* | 8/2004 | Chang | 704/247 |
| 2004/0186724 A1* | 9/2004 | Morin | 704/273 |
| 2004/0232221 A1* | 11/2004 | Beenau et al. | 235/380 |
| 2005/0071168 A1* | 3/2005 | Juang et al. | 704/273 |
| 2007/0219801 A1* | 9/2007 | Sundaram et al. | 704/270 |
| 2007/0250924 A1 | 10/2007 | Ono et al. | |
| 2007/0255564 A1* | 11/2007 | Yee et al. | 704/246 |
| 2007/0288759 A1 | 12/2007 | Wood et al. | |
| 2008/0082451 A1 | 4/2008 | Schneider et al. | |
| 2009/0157454 A1* | 6/2009 | Carter et al. | 705/7 |
| 2009/0233579 A1 | 9/2009 | Castell et al. | |
| 2009/0276733 A1 | 11/2009 | Manyam et al. | |
| 2010/0086108 A1* | 4/2010 | Jaiswal et al. | 379/88.04 |
| 2010/0106502 A1* | 4/2010 | Farrell et al. | 704/246 |
| 2010/0180127 A1 | 7/2010 | Li et al. | |
| 2011/0119141 A1 | 5/2011 | Hoyos et al. | |
| 2011/0142234 A1 | 6/2011 | Rogers | |
| 2012/0130714 A1* | 5/2012 | Zeljkovic et al. | 704/235 |
| 2012/0253805 A1* | 10/2012 | Rajakumar et al. | 704/236 |
| 2013/0006784 A1 | 1/2013 | Krauss et al. | |
| 2013/0132091 A1* | 5/2013 | Skerpac | 704/273 |
| 2013/0173268 A1* | 7/2013 | Weng et al. | 704/249 |
| 2013/0195285 A1* | 8/2013 | De La Fuente et al. | 381/92 |
| 2013/0232073 A1 | 9/2013 | Sheets et al. | |
| 2013/0290136 A1 | 10/2013 | Sheets et al. | |

OTHER PUBLICATIONS

International Search Report and Written Opinion for International Patent Application No. PCT/US/029177, mailed on Jun. 27, 2013, 11 pages.

* cited by examiner

SYSTEM AND METHOD FOR AUTHENTICATION USING SPEAKER VERIFICATION TECHNIQUES AND FRAUD MODEL

CROSS-REFERENCES TO RELATED APPLICATIONS

The present application is a non-provisional application of and claims priority to U.S. Provisional Application No. 61/761,155, filed on Feb. 5, 2013, the entire contents of which are herein incorporated by reference for all purposes.

BACKGROUND

Embodiments of the invention are directed to systems and methods that allow for cardholder verification using voice biometric techniques. A number of instances have occurred where a cardholder may wish to make a purchase with their mobile device or initiate some other type of e-commerce transaction from their mobile device. However, these types of purchases/transactions inherently carry a high risk because the cardholder does not use their physical payment card to complete the purchase/transaction. As such, many card issuers or merchants may wish to have an extra level of security to verify the identity of the cardholder wishing to complete the purchase/transaction with their mobile device. Current solutions have attempted to use text dependent speaker verification to verify the identity of the cardholder. However, these solutions are vulnerable to replay attacks by fraudsters because the text is repeated many times to obtain the cardholder's voiceprint that is stored in a database.

Embodiments of the invention address this and other problems, both individually and collectively.

SUMMARY

Embodiments of the invention broadly described, allow for speaker verification for authentication purposes through a communication device. More specifically, the invention pertains to transactions initiated from a communication device, such as a mobile phone or personal computer, for both face-to-face and remote payment environments.

Embodiments of the present invention relate to systems and methods for cardholder verification using voice biometric techniques, specifically a variation of a conventional prompted text independent speaker verification system. Embodiments of the invention provide for speaker verification on a communication device without requiring a user to go through a formal registration process with the issuer or payment network. Certain embodiments allow the use of a captured voice sample attempting to reproduce a word string having a random element to authenticate the user. Authentication of the user is based on both a match score indicating how closely the captured voice samples matches to previously stored voice samples of the user (called "a model of the user's voice") and a pass or fail response indicating whether the voice sample is an accurate reproduction of the word string. A payment processing network may maintain a history of the authenticated transactions and voice samples.

One embodiment of the invention is directed to a method comprising providing, by a device, a word string that comprises a random element. An audio segment is received by the device wherein the audio segment originated from a user. The audio segment is held in a queue for a predetermined period of time. A model of the user's voice is updated with the audio segment after the predetermined period of time has elapsed, and no fraud has been reported.

Another embodiment of the invention is directed to a device comprising a processor, and a computer readable medium coupled to the processor. The computer readable medium comprises code, executable by the processor, for implementing the above-described method.

It can be appreciated that while the discussion herein describes examples using a payment card and a cardholder, the payment card may be generically referred to as any payment instrument and the cardholder may be generically referred to as a user in other embodiments (where a card is not present).

These and other embodiments of the invention are described in further detail below.

DETAILED DESCRIPTION

Figure 1:
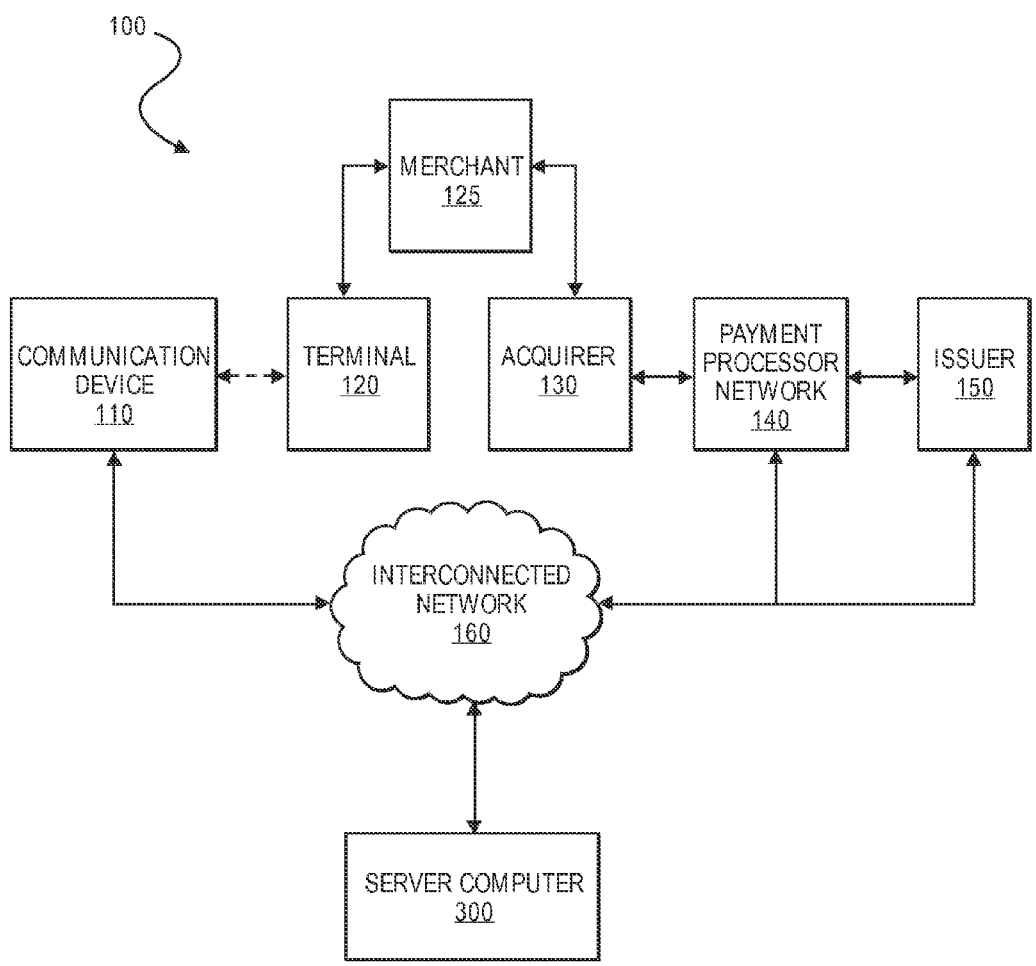
FIG. 1 is a block diagram of a payment system, according to an embodiment of the present invention.

Prior to discussing the specific embodiments of the invention, a further description of some terms can be provided for a better understanding of embodiments of the invention.

A "payment device" may include any suitable device capable of making a payment. For example, a payment device can include a card including a credit card, debit card, charge card, gift card, or any combination thereof. A payment device can be used in conjunction with a communication device, as further defined below.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

An "authorization request message" can include a request for authorization to conduct an electronic payment transaction. It may further include an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by users using payment cards.

An "authorization response message" can be a message that includes an authorization code, and may typically be produced by an issuer. A "transaction response" may be an authorization response message in some embodiments of the invention.

A "server computer" can be a powerful computer or a cluster of computers. For example, the server computer can be a large mainframe, a minicomputer cluster, or a group of servers functioning as a unit. In one example, the server computer may be a database server coupled to a Web server.

A "terminal" (e.g. a point-of-service (POS) terminal) can be any suitable device configured to process payment transactions such as credit card or debit card transactions, or electronic settlement transactions, and may have optical, electrical, or magnetic readers for reading data from other portable communication devices such as smart cards, keychain device, cell phones, payment cards, security cards, access cards, and the like.

An "acquirer" is a business entity (e.g., a commercial bank) that typically has a business relationship with the merchant and receives some or all of the transactions from that merchant.

An "issuer" is a business entity which issues a card to a user. Typically, an issuer is a financial institution.

A "cardholder" is a type of user that is authorized to use a payment card issued by the issuer. The terms "cardholder" and "user" may be used interchangeably in the following description. A "user" and/or "cardholder" may be any competent individual.

"Biometric data" includes data that can be used to uniquely identify an individual based upon one or more intrinsic physical or behavioral traits. For example, biometric data may include fingerprint data and retinal scan data. Further examples of biometric data include digital photographic data (e.g., facial recognition data), deoxyribonucleic acid (DNA) data, palm print data, hand geometry data, and iris recognition data. In the context of the present invention, biometric data may include voice data.

"Speaker recognition" is the identification of a user who is speaking based on characteristics of their voice (voice biometrics). Speaker recognition uses the acoustic features of speech that have been found to differ between individuals. These acoustic patterns reflect both anatomy (e.g., size and shape of the throat and mouth) and learned behavioral patterns (e.g., voice pitch, speaking style).

"Speech recognition" is the translation of spoken words into text understandable by a computer system. Speech recognition combined with speaker recognition may simplify the task of translating speech in systems that are used to authenticate or verify the identity of a speaker as part of a security process.

"Voice recognition" may be used to describe both "speaker recognition" and "speech recognition".

A "fraud model," as described herein, can be a model representing a risk factor associated with a user. The fraud model may contain information about current and prior user authentications with a verification system. For example, the fraud model may contain the time, location, voice data, and match score associated with each particular voice authentication with the verification system by the user. The combination of information within the fraud model about prior authentications may be used to determine the risk factor associated with the user.

A "prompt," as described herein, can be a combination of a number of words arranged in a particular order. A user may be requested to repeat a prompt for authentication purposes. The terms "prompt" and "word string" may be used interchangeably in the following description.

A "voice sample," as described herein, can be captured digital audio data of a user's voice. For example, a voice sample may be a captured digital data signal of a user who wishes to authenticate with a transaction system. The user may be requested to repeat a certain prompt. The microphone may capture the prompt repeated by the user and pass the audio data to another module for speaker verification. The terms "voice sample," "voice data," and "audio segment" may be used interchangeably in the following description.

A "match score," as described herein, can be a relationship between received input data and stored data. In the context of the present invention, the received input data can be a captured voice sample. The stored data can be a previously captured and stored voice sample. The match score may express the degree of confidence between the received input data and the stored data. The match score may be passed to other parts of a risk scoring mechanism, such that the match score contributes along with other risk parameters to an overall decision, for example, approving or declining a transaction. Setting an appropriate threshold to ensure an acceptable level of accuracy would be appreciated by one of ordinary skill in the art. This concept can be applied to other biometric data apart from voice samples (e.g., retinal scans, facial recognition data, etc.).

A "communication device," as described herein, can be any electronic communication device that can execute and/or support electronic communications including, but not limited to, payment transactions. Some examples include a personal digital assistant (PDA), a smart phone, tablet computer, notebook computer, and the like.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

I. Exemplary Systems

FIG. 1 is a block diagram of a payment system 100, according to one embodiment of the present invention. The system 100 includes a communication device 110, a terminal 120, a merchant 125, an acquirer 130, a payment processing network 140, an issuer 150, and an interconnected network 160. The acquirer 130 may further include an acquirer computer (not shown). The payment processing network 140 may include an authorization and settlement server and/or additional servers (not shown) to carry out the various transactions described herein.

In an embodiment, the communication device 110 is in electronic communication with the terminal 120. The communication device 110 can be a personal digital assistant (PDA), a smart phone, tablet computer, notebook computer, or the like, that can execute and/or support payment transactions with a payment system 100. A communication device 110 can be used in conjunction with a payment device, such as a credit card, debit card, charge card, gift card, or other payment device and/or any combination thereof. The combination of a payment device (e.g., credit card) and the communication device 110 (e.g., smart phone) can be referred to as the communication device 110 for illustrative purposes. In other embodiments, the communication device 110 may be used in conjunction with transactions of currency or points (e.g., points accumulated in a particular software application). In further embodiments, the communication device 110 may be a wireless device, a contactless device, a magnetic device, or other type of payment device that would be known and appreciated by one of ordinary skill in the art with the benefit of this disclosure. In some embodiments, the communication device 110 includes software (e.g., application) and/or hardware to perform the various payment transactions and capture user voice data as further described below.

The terminal 120 is configured to be in electronic communication with the acquirer 130 via a merchant 125. In one embodiment, the terminal 120 is a point-of-service (POS) device. Alternatively, the terminal 120 can be any suitable device configured to process payment transactions such as credit card or debit card transactions, or electronic settlement transactions, and may have optical, electrical, or magnetic readers for reading data from portable electronic communication devices such as smart cards, keychain device, cell phones, payment cards, security cards, access cards, and the like. In some embodiments, the terminal 120 is located at and controlled by a merchant. For example, the terminal 120 can be a POS device at a grocery store checkout line. In other embodiments, the terminal could be a client computer or a mobile phone in the event that the user is conducting a remote transaction.

The acquirer 130 (e.g., acquirer bank) includes an acquirer computer (not shown). The acquirer computer can be configured to transfer data (e.g., bank identification number (BIN), etc.) and financial information to the payment processing network 140. In some embodiments, the acquirer 130 does not need to be present in the system 100 for the communication device 110 to transfer the financial and user data to the payment processing network 140. In one non-limiting example, the acquiring bank 130 can additionally check the credentials of the user against a watch list in order to prevent fraud and money laundering schemes, as would be appreciated by one of ordinary skill in the art.

In one embodiment, the payment processing network 140 is VisaNet™, where Visa internal processing (VIP) performs the various payment processing network 140 or multi-lateral switch functions described herein. The payment processing network 140 can include an authorization and settlement server (not shown). The authorization and settlement server ("authorization server") performs payment authorization functions. The authorization server is further configured to send and receive authorization data to the issuer 150. Furthermore, the payment processing network 140 can receive a voice sample by the user (e.g., from the payment device 110, terminal 120, or acquirer 130) to determine a risk factor associated with a transaction, as further described below.

In some embodiments, the issuer 150 is a business entity which issues a card to a card holder. Typically, an issuer is a financial institution. The issuer 150 is configured to receive the authorization data from the payment processing network 140 (e.g., the authorization server). The issuer 150 receives authentication data from the authorization server and determines if the user is authorized to perform a given financial transaction (e.g., cash deposit/withdrawal, money transfer, balance inquiry) based on whether the user was authenticated by an identification system.

In some embodiments, the communication device 110 may be connected to and communicate with the payment processor network 140 via an interconnected network 160. One example of an interconnected network 160 is the Internet. The payment processor network 140 may inform the communication device 110 when a payment has been successfully processed. In some embodiments, the payment processor network 140 may be connected to and communicate with the terminal 120 via the interconnected network 160. The payment processor network 140 may inform the terminal 120 when a payment has been successfully processed which in turn the terminal 120 may complete the transaction with the communication device 110.

A voice biometric matching server 300 is also shown in FIG. 1, and is in operative communication with the interconnected network 160. Details regarding the server 300 are provided below.

The interconnected network 160 may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In a typical payment transaction in embodiments of the invention, a user may interact with the terminal 120 (e.g., with a payment device such as a payment card, or by entering payment information) to conduct a transaction with the merchant 125. The merchant 125 may be operate a merchant computer, which may route an authorization request message to the acquirer 130, and eventually to the issuer 150 via the payment processing network 140.

The issuer 140 will then determine if the transaction is authorized (e.g., by checking for fraud and/or sufficient funds or credit). The issuer will then transmit an authorization response message to the terminal 120 via the payment processing network 140 and the acquirer 130.

At the end of the day, the transaction is cleared and settled between the acquirer 130 and the issuer 150 by the payment processing network 140.

The description below provides descriptions of other components in the system as well as authentication methods using voice samples. The authentication methods can be performed at any suitable point during the above-described transaction flow. For example, the voice authentication method may be performed before or after the user uses a payment device to interact with the terminal 120. If it is afterwards, then the authentication method may be performed when the authorization request message is received by the payment processing network 140 or the issuer 150.

Figure 2:
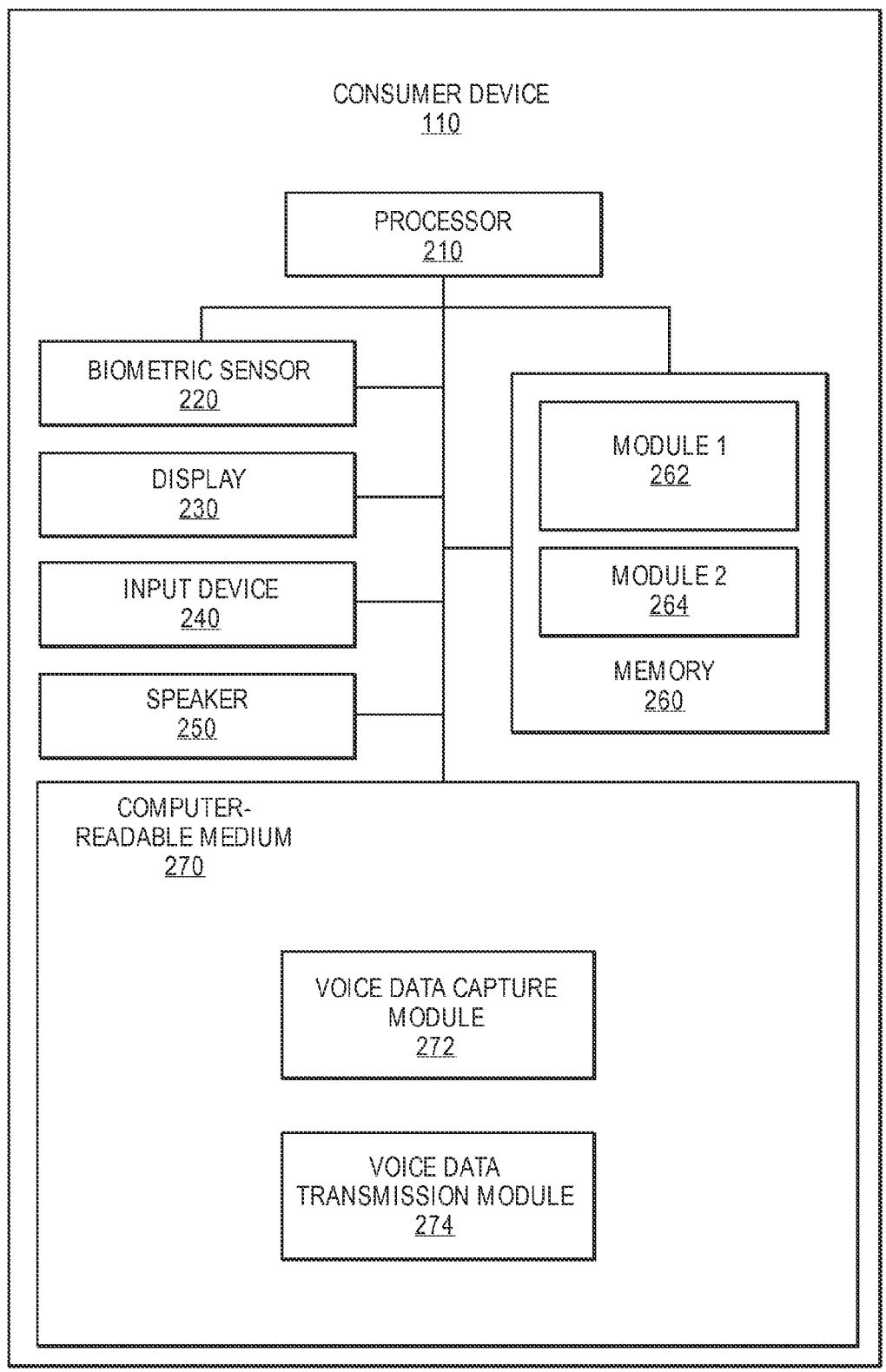
FIG. 2 is a block diagram of a communication device, according to an embodiment of the present invention.

FIG. 2 is a block diagram of a communication device 110, according to an embodiment of the present invention. Communication device 110 includes a processor 210, a microphone 220, a display 230, an input device 240, a speaker 250, a memory 260, and a computer-readable medium 270.

Processor 210 may be any general-purpose processor operable to carry out instructions on the communication device 110. The processor 210 is coupled to other units of the communication device 110 including display 230, input device 240, speaker 250, memory 260, and computer-readable medium 270.

Microphone 220 may be any device that converts sound to an electric signal. In some embodiments, microphone 220 may be used to capture voice data from a user.

Display 230 may be any device that displays information to a user. Examples may include an LCD screen, CRT monitor, or seven-segment display.

Input device 240 may be any device that accepts input from a user. Examples may include a keyboard, keypad, or mouse. In some embodiments, microphone 220 may be considered an input device 240.

Speaker 250 may be any device that outputs sound to a user. Examples may include a built-in speaker or any other device that produces sound in response to an electrical audio signal. In some embodiments, speaker 250 may be used to request the user for a biometric input or to provide feedback on the progress of biometric detection.

Memory 260 may be any magnetic, electronic, or optical memory. Memory 260 includes two memory modules, module 1 262 and module 2 264. It can be appreciated that memory 260 may include any number of memory modules. An example of memory 260 may be dynamic random access memory (DRAM).

Computer-readable medium 270 may be any magnetic, electronic, optical, or other computer-readable storage medium. Computer-readable storage medium 270 includes voice data capture module 272, and voice data transmission module 274. Computer-readable storage medium 270 may comprise any combination of volatile and/or non-volatile memory such as, for example, buffer memory, RAM, DRAM, ROM, flash, or any other suitable memory device, alone or in combination with other data storage devices.

Voice data capture module 272 is configured to capture voice data, via microphone 220, by a user for voice authentication purposes. In some embodiments, voice data capture module 272 may capture voice data by the user for purposes of initially registering a user, for subsequent voice authentication, for the first time. In some embodiments, voice data capture module 272 may capture voice data, via microphone 220, for purposes of authenticating a user in order to complete a transaction. For example, communication device 110 may request a user to register or authenticate his/her voice data by displaying a prompt, on display 230, to repeat (by speaking into microphone 220) a specific prompt. Upon capturing the user's voice data via microphone 220, the voice data corresponding to the prompted prompt may be transmitted to a server computer via voice data transmission module 274 for purposes of storing the voice data for future user authentication, described below.

Voice data transmission module 274 is configured to transmit captured voice data to a server computer. In some embodiments, the captured voice data may be voice data captured during user registration and/or authentication by voice data capture module 272, described above. In some embodiments, the captured voice data may be voice data captured during subsequent authentication using voice data by the user, described in further detail below.

Figure 3:
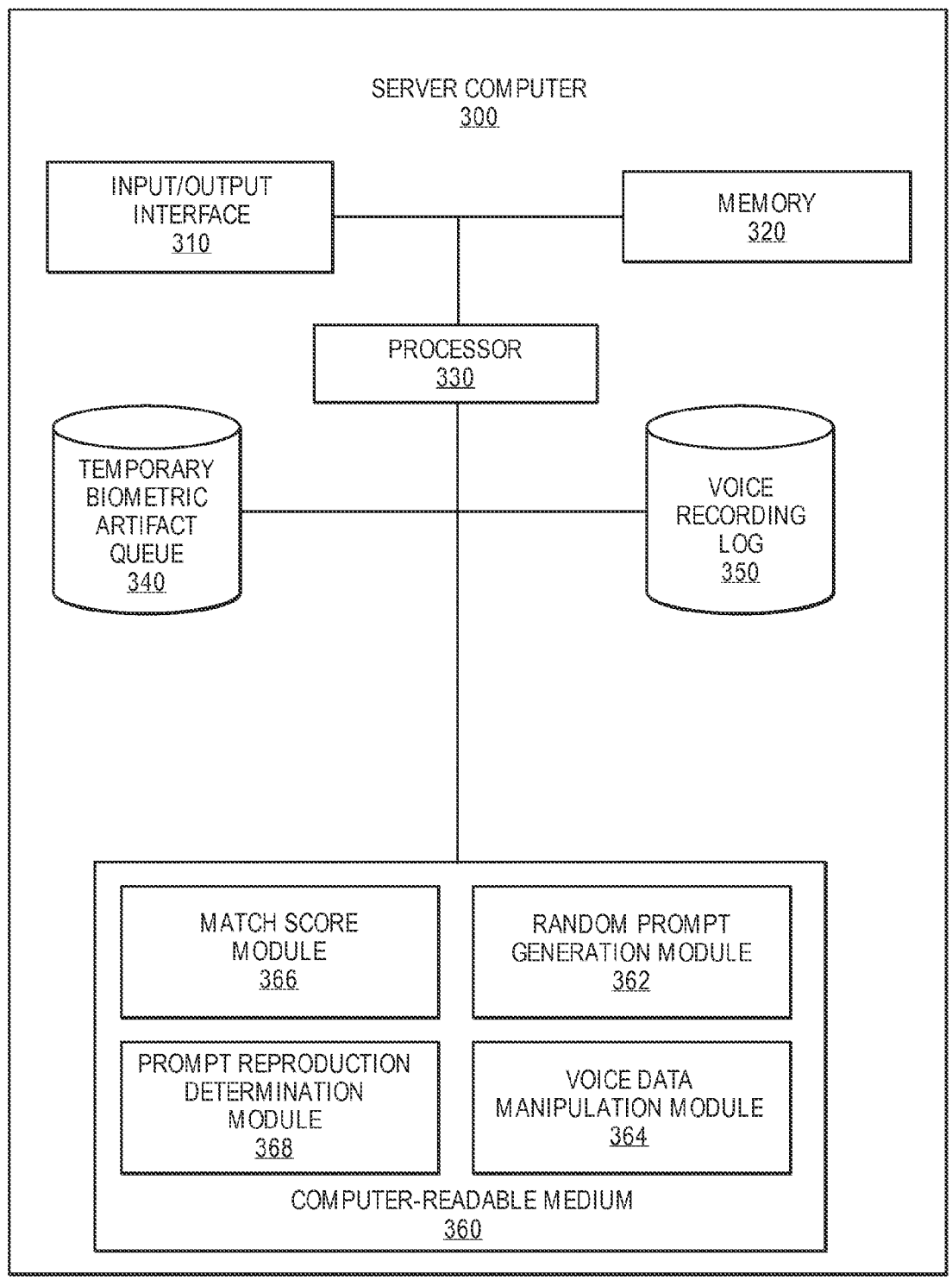
FIG. 3 is a block diagram of a server computer, according to an embodiment of the present invention.

FIG. 3 is a block diagram of a server computer 300, according to an embodiment of the present invention. Server computer 300 includes an input/output interface 310, a memory 320, a processor 330, a temporary voice data queue 340, a user fraud profile database 350, and a computer-readable medium 360. In some embodiments, the server computer may reside within the interconnected network 160.

The input/output (I/O) interface 310 is configured to receive and transmit data. For example, the I/O interface 310 may receive the voice data from the communication device 110 (FIG. 1), via the voice data transmission module 274 (FIG. 1). Upon processing and verifying the authenticity of the voice data, the I/O interface 310 may indicate to the terminal 120 (FIG. 1) and/or communication device 110 (FIG. 1) that a payment transaction may proceed. The I/O interface 310 may also be used for direct interaction with the server computer. The I/O interface 310 may accept input from an input device such as, but not limited to, a keyboard, keypad, or mouse. Further, the I/O interface may display output on a display device.

Memory 320 may be any magnetic, electronic, or optical memory. It can be appreciated that memory 320 may include any number of memory modules, that may comprise any suitable volatile or non-volatile memory devices. An example of memory 320 may be dynamic random access memory (DRAM).

Processor 330 may be any general-purpose processor operable to carry out instructions on the server computer 300. The processor 330 is coupled to other units of the server computer 300 including input/output interface 310, memory 320, temporary voice data queue 340, user fraud profile data base 350, and computer-readable medium 360.

Temporary voice data queue 340 is configured to temporarily store the voice data captured by the voice data capture module 272 (FIG. 2). In some embodiments, the temporary voice data queue 340 is a queue within a database on server computer 300. In some embodiments, the input/output interface 310 forwards the voice data received by the voice data transmission module 274 (FIG. 1) to the temporary voice data queue 340. The temporary biometric voice data queue 340 temporarily stores the voice data for a predetermined period of time prior to storing the voice data in the user fraud profile database 350. In some embodiments, predetermined period of time is a time period during which no fraud is reported to the issuer 150 (FIG. 1). If no fraud is reported to the user 150 (FIG. 1) during the predetermined period of time, there may be reasonable certainty that the voice data of the actual payment user was captured and the voice data may be stored in the user fraud profile database 350 for purposes of building the voice recording log (discussed below).

The voice recording log database 350 is configured to store a fraud profile of a payment user. The fraud profile of a payment user may include attributes such as, but not limited to, initiation time of the payment transaction, the payment cardholder's name, the voice data associated with the payment transaction, the outcome of payment cardholder verification/authentication, and a match score for the audio data. These attributes of the payment user's fraud profile are described in detail in FIG. 7.

Computer-readable medium 360 may be any magnetic, electronic, optical, or other computer-readable storage medium. Computer-readable storage medium 360 includes random prompt generation module 362, voice data manipulation module 364, match score module 366, and prompt reproduction determination module 368. Computer-readable storage medium 360 may comprise any combination of volatile and/or non-volatile memory such as, for example, buffer memory, RAM, DRAM, ROM, flash, or any other suitable memory device, alone or in combination with other data storage devices.

Random prompt generation module 362 is configured to generate a random prompt intended to be spoken by the user for registration and/or authentication purposes. Random prompt generation module 362 may generate the random prompt and transmit it to communication device 110 (FIG. 1) via I/O interface 310 so that communication device 110 (FIG. 1) may display the randomly generated prompt to the user via display 230 (FIG. 1). Random prompt generation module 362 may generate prompts from a set of possible prompts large enough such that it may be highly unlikely that an individual user may be prompted more than once for the same set of words or prompts. In some embodiments, the random prompts generated by random prompt generation module 362 may be relatively short in length. In some embodiments, the random prompt generation module 362 may generate a single random word in combination with a fixed prompt.

Voice data manipulation module 364 is configured to temporarily store the captured voice data in the temporary voice data queue 340. As described above, the voice data queue 340 temporarily stores the captured voice data for a predetermined period of time prior to storing the voice data in the user fraud profile database 350. Upon expiration of the predetermined period of time, the voice data manipulation module 364 may forward the voice data from the temporary voice data queue 340 to the user fraud profile database 350 for purposes of building the user fraud profile.

Match score module 366 is configured to calculate a match score associated with captured voice data for each user voice authentication. The match score may be based on score (typically between 0 and 100), where the score expresses a degree of confidence that the captured voice data matches with previously captured and stored voice data from the user and ultimately that the user attempting to authenticate is the genuine user. This score can be passed on to other parts of a risk scoring mechanism, such that the score, along with other risk parameters, contributes to the overall decision of approving or declining the transaction.

Prompt reproduction determination module 368 is configured to determine whether the captured audio data from the user is an accurate reproduction of the prompt generated by random prompt generation module 362. In some embodiments, prompt reproduction determination module 368 may include speech recognition technology operable for determining whether the captured audio data matches the words/prompts that were prompted for/generated by random prompt generation module 362.

It can be appreciated that in some embodiments the voice biometric matching server 300 may reside within the payment processor network 140 (FIG. 1).

Figure 4:
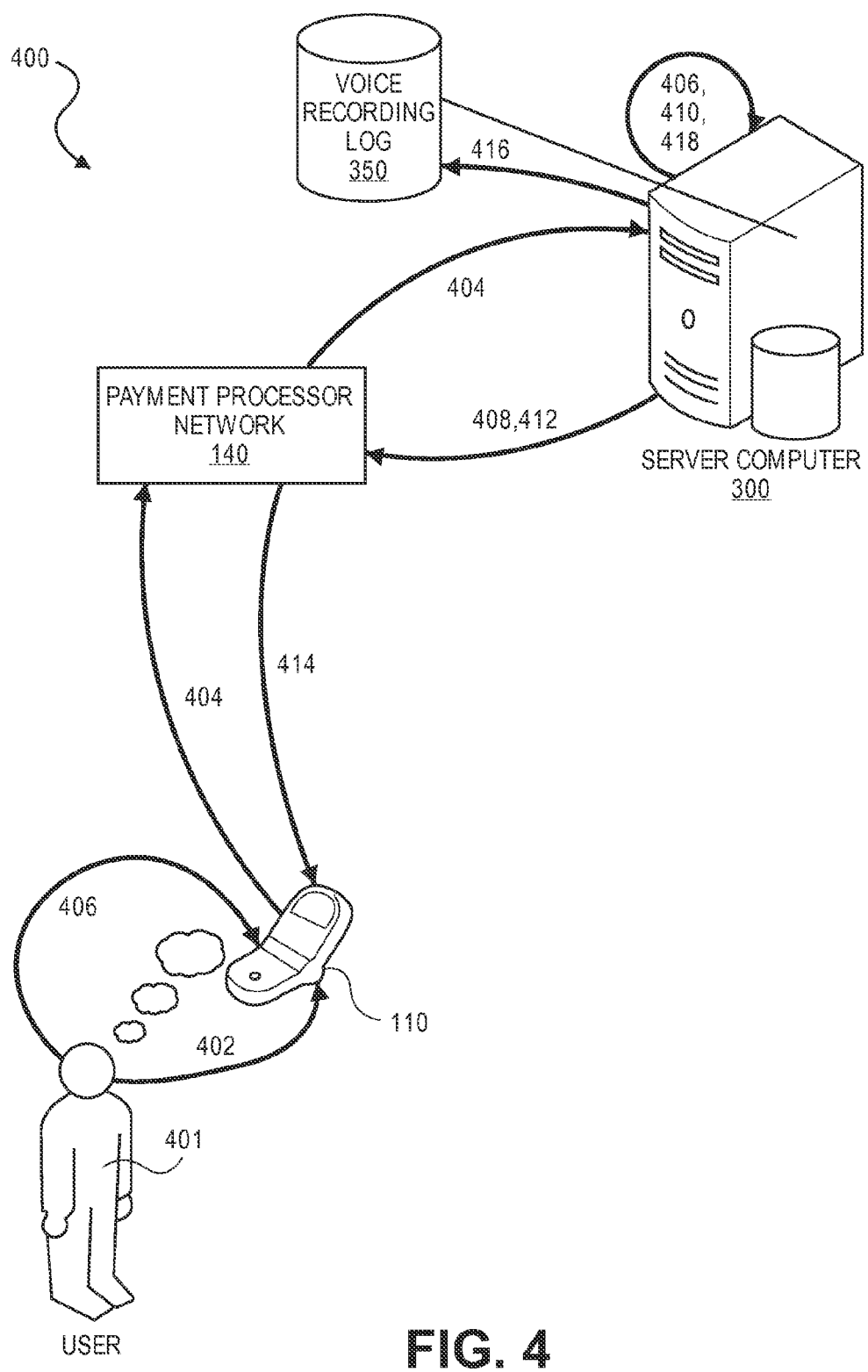
FIG. 4 is a flow diagram illustrating a method for authenticating a user for a transaction, according to an embodiment of the present invention.

FIG. 4 is a flow diagram illustrating a method for authenticating a user for a transaction, according to an embodiment of the present invention. The speaker verification system 400 includes a communication device 110 (e.g., mobile phone), payment processor network 150, and a voice biometric matching server 300. The voice biometric speaker verification system 400 provides a mechanism to authenticate a user 401 using voice biometric authentication techniques, specifically a variation of a conventional prompted text independent speaker verification system which is well known in the art.

In conventional prompted text independent speaker verification systems, a user 401 (or cardholder) is not requested to repeat text as they may be with a text dependent verification system. Rather, the user 401 is requested to speak randomized text. Further, conventional text independent speaker verification systems may require a user 401 to speak very long sentences or strings of words. However, using this type of method in the context of authentication and verification places a burden on and is inconvenient for the user 401. To overcome this shortcoming, the speaker verification system 400 of FIG. 4 obtains shorter segments of words from the user 401. For example, the speaker verification system 400 may prompt the user 401, via display 230 (FIG. 2) of communication device 110, normal questions such as "Please state your name", or the user may navigate the application using voice which may be captured and used. These types of normal questions typically require only a short sentence or string of words as a response by the user 401. In some embodiments of the invention, the prompt is less than about 7 words in length, and preferably five or less words in length. By keeping the lengths of the prompts short, users are less frustrated and are more likely to use the systems and methods according to embodiments of the invention.

In another example, the speaker verification system 400 may prompt the user 401 with a prompt having a variable or random element. In some embodiments, the prompt may have both a random element and a fixed element, with the fixed element being greater than the random element. In some embodiments, the fixed element can have a length of 7, 5, 3, or 2 words or less, while the random element may have a length of 5, 3, or 2 words or less. For example, embodiments of the invention may provide a first prompt such as "Please repeat the word TREE LEAVES" and subsequently a second prompt such as "Please repeat the words CAT AND DOG". The phrase "Please repeat the words" may be a fixed portion of the prompt, while words "TREE LEAVES" and "CAT AND DOG" may be random or variable portions of the prompt.

The obtained voice data (voice segment) for the short prompt may then be transmitted from the communication device 110 to the voice biometric matching server 300 (via payment processor network 140). It can be appreciated that the obtained voice data may also be transmitted from the communication device 110 to the voice biometric matching server 300 directly. The voice biometric matching server 300 may then parse the voice data and analyze It, and the voice data may be held in a "pending" state within a temporary voice data queue 340 (FIG. 3) within the voice biometric matching server 300. They may be done prior to forwarding the voice data to a user fraud profile 450 for the user 401 that also resides within the voice biometric matching server 300. Once a predetermined period of time has passed, e.g. one week, and no fraud has been reported to the payment processor network 140, the data may be forwarded to the voice recording log database 450. In some embodiments, the temporary voice data queue (FIG. 3) may reside within the voice bio metric matching server 300. The voice data may be stored in the database 450 and the user's 401 user fraud profile 450 may be updated and may be used for future evaluation of voice data from the cardholder 401. By allowing a predetermined time to pass before updating the user's fraud profile, it is possible to ensure that the fraud profile is accurate and up to date. Thus, the speaker verification system 400 prevents replay attacks from fraudsters who wish to record a name or steal a user's 401 voiceprint in order to attempt to impersonate the genuine user 401.

In some embodiments, the request to the user 401 to speak the prompt may be displayed on the communication device 110. The speaker verification system 400 is described in further detail below.

In some embodiments, the voice biometric matching server 300 provides a pass/fail score that can be used as what is known as a "Cardholder Verification Mechanism" (CVM) in certain standards, alongside other CVMs such as a Personal Identification Number (PIN) or signature. In this mode, a terminal (e.g., at merchant) will be informed as to whether speaker validation has passed or failed, and can make a decision whether to proceed with the transaction. The determination of the pass/fail score may be made by the voice biometric matching server 300 upon receiving the voice data. In some embodiments, the pass/fail response may be based on whether the user 401 has accurately reproduced the requested prompt. That is, whether the user 401 has spoken the correct words of the prompt in the order that they are expected to be spoken in.

In some embodiments, the voice biometric matching server 300 provides a score (typically between 0 and 100), where the score expresses a degree of confidence that a user 401 is the genuine user 401. This score can be passed on to other parts of a risk scoring mechanism (one run by payment processor, by the issuer, or by a third party), such that the score, along with other risk parameters, contributes to the overall decision of approving or declining the transaction. In some embodiments, the match score is based on how closely the captured voice data matches to previously captured voice data. That is, how closely the current voice sample matches to previously obtained voice samples from the user. This may be determined by analyzing features of the voice sample such as, but not limited to, tone, pitch, etc.

Accordingly, speaker voice authentication and verification provide an added layer of assurance that can be selectively drawn upon, e.g. for transactions that are deemed risky and which may otherwise have a high likelihood of declines ("Step-up authentication"). In particular such an option may be attractive if the communication device 110 is used to initiate the transaction, since in this case the communication device 110 may not play the role of a secondary channel or device if it is already the payment instrument for that transaction.

In some embodiments, the payment processor network 140, a payment processor, or a third party may provide a channel (not shown in FIG. 1) through which to prompt the user 401 during a payment transaction. The prompt may be displayed on the communication device 110 and may request that the user 401 to speak certain words or prompts. As described above, the recording of the user 401 speaking those words or prompts may then be transmitted to a voice biometric matching server 300, which may perform the voice biometric authentication.

The channel through which the user 401 is prompted may utilize an application on his/her communication device 110 (e.g., mobile phone), an Internet session using a browser or app on their phone or PC, or some other mechanism that allows the prompted words or prompts to be displayed or played and allows the user's 401 voice to be recorded (via a microphone on communication device 110) and transmitted to the voice biometric matching server 300 (via the payment processor network 140). In some embodiments, the prompts may be displayed visually on communication device 110. In some embodiments, the prompts may be played audibly on communication device 110.

Figure 5A:
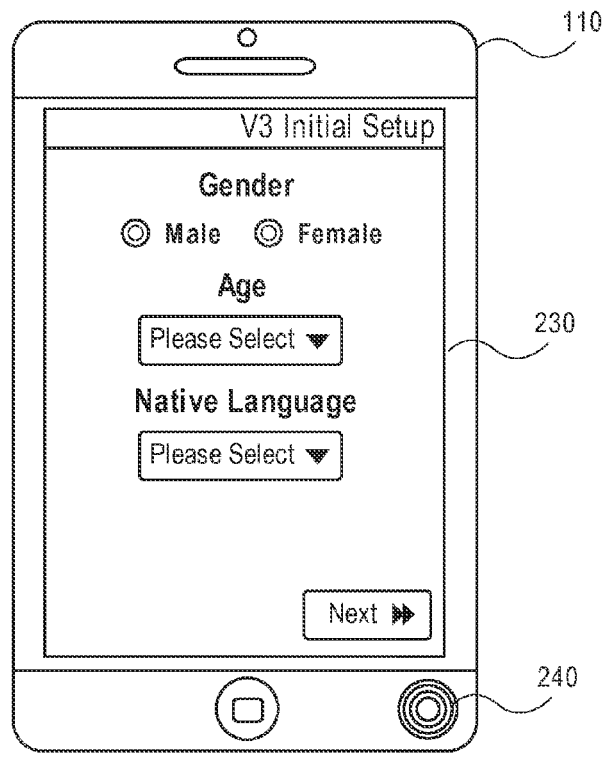
FIG. 5A shows a screenshot of initial speaker verification enrollment on a communication device, according to an embodiment of the present invention.

FIG. 5A shows a screenshot of initial speaker verification enrollment on a communication device 110, according to an embodiment of the present invention. The screenshot shows an example of a prompt, presented on the display 230, for user 401 (FIG. 4) enrollment in the voice speaker verification system 400 (FIG. 4) that may be displayed on the communication device 110 (FIG. 1). FIG. 5A illustrates the first step in initial enrollment with the speaker verification system 400. During enrollment, no match scoring is calculated. Instead, the captured voice recordings of the user 401 (FIG. 4) may be used to build a model of the user's 401 (FIG. 4) voice. These voice recordings may be submitted to the voice biometric matching server 300 (FIG. 4) as enrollment recordings, and the voice biometric matching server 300 (FIG. 4) may create a model for the user 401 (FIG. 4) and store this model for future reference, the model being linked to the user 401 (FIG. 4). In some embodiments, the model may be stored within the user fraud profile database 450 (FIG. 4) within the voice biometric matching server 300 (FIG. 4).

During initial enrollment, the prompt may ask the user for their gender, age, and/or native language. This information about the user 401 (FIG. 4) may be stored in the user fraud profile database 450 (FIG. 4) within the voice biometric matching server 300 (FIG. 4).

Figure 5B:
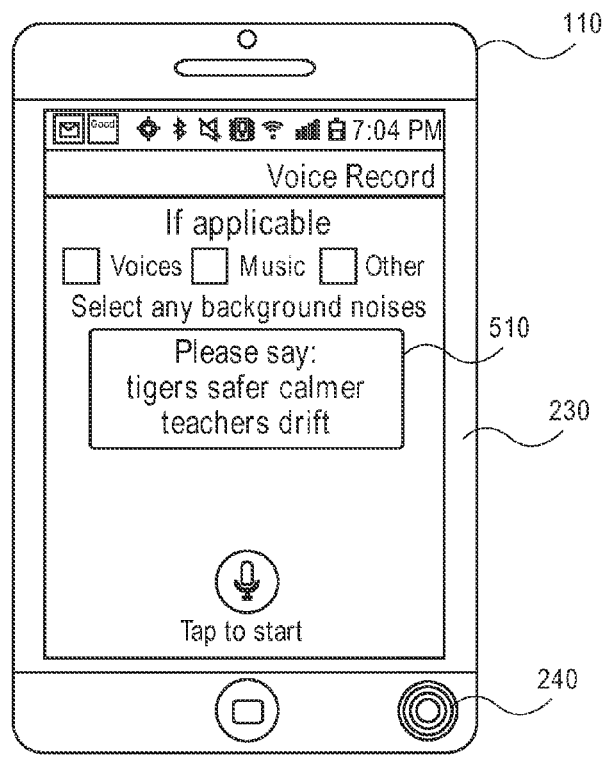
FIG. 5B shows a screenshot of capturing a voice sample for speaker verification enrollment, according to an embodiment of the present invention.

FIG. 5B shows a screenshot of capturing a voice sample for speaker verification enrollment, according to an embodiment of the present invention. After the user 401 (FIG. 4) enters his/her user details, as described above, the speaker verification system 400 (FIG. 4) may further request that the user 401 (FIG. 4) speak a specified prompt 510. For example, the prompt 510 may request that the cardholder 401 (FIG. 4)

speak the words, "tigers safer calmer teachers drift." It can be appreciated that the enrollment prompt 510 may be different for each user 401 (FIG. 4) or different for each enrollment attempt. It can further be appreciated that the enrollment prompt 510 may differ from the authentication prompt (see below). Further, the user 401 (FIG. 4) may be required to speak multiple prompts prior to completing enrollment with the speaker verification system 300 (FIG. 4).

In some embodiments, the user 401 (FIG. 4) may be able to select whether any type of background noises, such as other individuals speaking, music, etc., exist at the time the user 401 (FIG. 4) is speaking the specific prompt 510 for enrollment. The user 401 (FIG. 4) may speak the specific prompt 510 and his/her voice may be captured by microphone 240. If the user 401 (FIG. 4) indicated that any background noises were present, the speaker verification system 400 may try to filter out the background noises prior to transmitting the voice data to the voice biometric matching server 300 (FIG. 4).

Figure 5C:
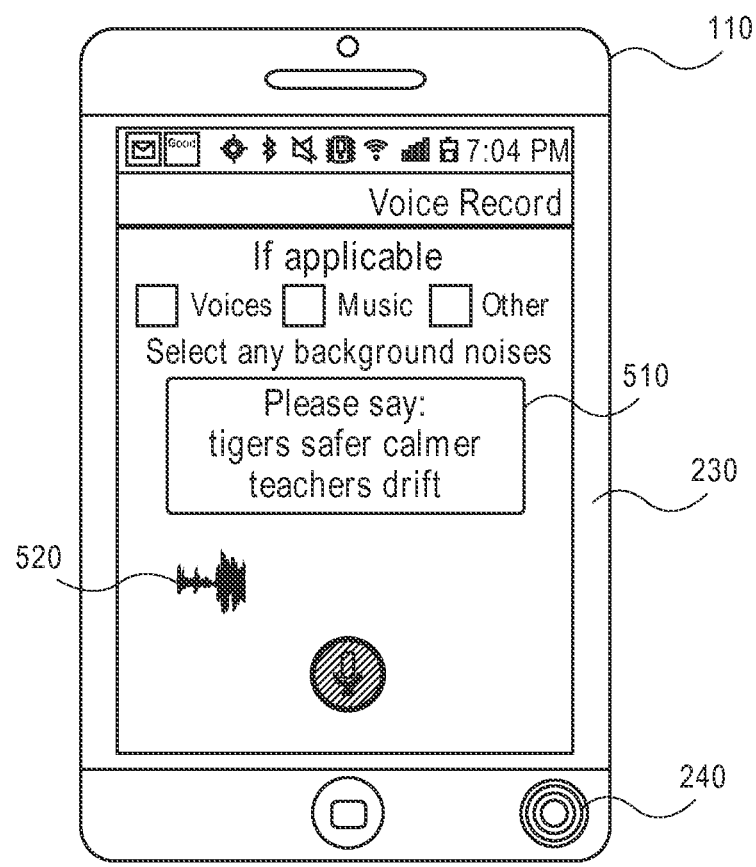
FIG. 5C shows a screenshot of progressive feedback while capturing a voice sample for speaker verification enrollment, according to an embodiment of the present invention.

FIG. 5C shows a screenshot of progressive feedback while capturing a voice sample for speaker verification enrollment, according to an embodiment of the present invention. As described above, the speaker verification system 400 (FIG. 4) may generate a prompt 510 for a user 401 (FIG. 4) to repeat for purposes of enrollment with the system. The prompt 510 may be generated by the voice biometric matching server 300 (FIG. 4). In some embodiments, a progressive feedback indicator 520 may be presented on display 230 of communication device 110. The progressive feedback indicator 520 may indicate to the user 401 (FIG. 4) his/her progress in completing repetition of the prompt 510 and may also indicate specifics of the analog voice signal being captured by the microphone 240.

Figure 6A:
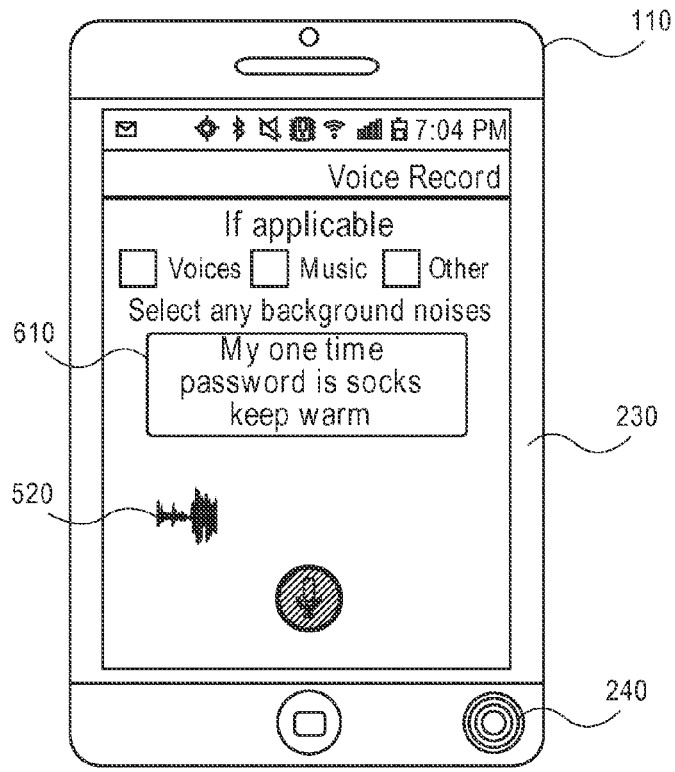
FIG. 6A shows a screenshot of speaker verification on a communication device using a first prompt, according to an embodiment of the present invention.

FIG. 6A shows a screenshot of speaker verification on a communication device using a first prompt 610, according to an embodiment of the present invention. After a sufficient number of successful recordings of prompts for enrollment have been made in order for the user's 401 (FIG. 4) model to be created, subsequent prompts 610 may be used for authentication and each recording of the user 401 (FIG. 4) may be submitted to the voice biometric matching server 300 (FIG. 4), which may respond with either a match/no match (pass/fail) response or with a match score, as described above.

The prompts for enrollment and for authentication may be quite short in length, in order to make for a positive user 401 (FIG. 4) experience, with each prompt 610 consisting of only a few words. For this reason it is anticipated that the first few recordings may be used for enrollment (building the model of the user's voice) before any authentication, as shown in FIG. 6A, may take place. The user 401 (FIG. 4) may not have to be made aware of any difference between enrollment and authentication. The user 401 (FIG. 4) may simply be prompted in connection with a payment transaction and may not necessarily have knowledge as to whether the voice recording may have played any role in the approval or decline of the transaction. For example, as illustrated in FIG. 5B, the user 401 (FIG. 4) may be prompted to speak "tiger safer calmer teachers drift," for enrollment. Similarly, as illustrated in FIG. 6A, the user 401 (FIG. 4) may be prompted to speak "my one time password is socks keep warm," for authentication.

In order to prevent prior recordings from being useful for any subsequent authentication (thus, to prevent replay attacks by a fraudster), a mechanism of text prompted voice verification may be used in combination with text dependent verification. For the text prompted portion, the prompts may be taken from a set of possible prompts large enough such that it may be highly unlikely that an individual user 401 (FIG. 4) may be prompted more than once for the same set of words or prompts. In addition, the voice biometric matching server 300 (FIG. 4) may not only determine if the voice of the submitted recording belongs to the same user 401 (FIG. 4) that performed the enrollment, but may also use speech recognition technology to determine whether the recording match the previously prompted words/prompts. Moreover, the lexicon of possible words may be large enough that even if a fraudster could record individual words from prior recordings, and reorder them, the fraudster would unlikely be able to combine the words to the complete new prompt. In this way the freshness of the recording may be ensure. However it may require that the voice biometric matching server 300 (FIG. 4) be aware of what each prompt is for each recording that it may receive for matching. In some embodiments, the voice biometric matching server 300 (FIG. 4) is aware of the prompts because it is responsible for generating the prompts via random prompt generation module 362 (FIG. 3).

Furthermore, in order to obtain higher reliability (lower error rates for the authentication) it may be desirable to increase the amount of speech submitted by the user 401 (FIG. 4) at the time of authentication. However, text prompts beyond 5-6 words may become problematic in terms of user convenience. For this reason the system may be adopted where the user 401 (FIG. 4) is told to always prefix their text prompt with a fixed sentence. This sentence could be any sequence of words, but for ease of usability by the customer it may be, for example, "My one time password is: XXXXXXX". For example, the prompt may be, "My one time password is socks keep warm."

Such a prompt may also make it more palatable to the user 401 (FIG. 4) to say out loud their prompted text because it may put the situation in a reasonable context for others who are in the user's 401 (FIG. 4) vicinity and may overhear the customer speaking, thus making it less likely that the user 401 (FIG. 4) will feel awkward or embarrassed about speaking their prompt. Further, it may not leak any significant security information.

The text dependent prompt may also function as a quality control gate keeper that performs speech recognition on the communication device 110 to recognize recording quality that is so poor (due to noise, low speaker volume, high speaker volume, etc.) that the user 401 (FIG. 4) may be prompted to try again, move to a quieter environment etc., prior to submitting the recording to the voice biometric matching server 300 (FIG. 4). This may improve the user 401 (FIG. 4) experience by lowering transaction time for problematic recordings.

The prompts may be designed to enable a convenient user 401 (FIG. 4) experience while providing the best feasible security. The prompts may consist of easy to pronounce words combined in such a way that each prompt may include sufficient phonemes for a high reliability matching to take place. For global solutions, the prompts may be provided in several languages and in any language the cardholder wishes.

For voice biometric matching, the quality of the model of a user's 401 (FIG. 4) voice may improve as more recording data is collected from the user 401 (FIG. 4). For reasons of customer convenience some embodiments keep each voice recording short, and thus it may require a (small) number of recordings for the model to reach an acceptable level of quality. It may be possible to subsequently improve the model by adding more recordings. Since the user 401 (FIG. 4) may be performing authentications using voice recordings, these recordings may be added to the user's 401 (FIG. 4) user fraud profile, thereby improving it. Often times, however, where new recordings become available after an initial enrollment, it is difficult to determine whether the recordings were those of the legitimate user 401 (FIG. 4) or of a fraudster. Therefore, adding voice prints may not be possible without risking to pollute the fraud model and actually make it closer to that of the fraudster's voice. In the particular case of payment transactions, however, it is possible after a certain time period has lapsed from when a voice recording was made in connection with an authentication for a payment transaction, to conclude that if no fraud was reported on that transaction, the voice on the recording was indeed the same as the voice of the legitimate user 401 (FIG. 4). As described above, with this delay, it is possible to improve each user's 401 (FIG. 4) voice recording log 450 (FIG. 4) as the user 401 (FIG. 4) continues to record their voice for authentication, and thus with use over time the voice biometric matching for each user 400 (FIG. 4) is likely to improve and adapt to long-term changes in their voices. This same trust-after-delay concept may be applied to the initial enrollment as well.

In some embodiments, the user 401 (FIG. 4) may be presented with a progressive feedback indicator 520 indicating progress towards capturing the user's voice for authentication.

Figure 6B:
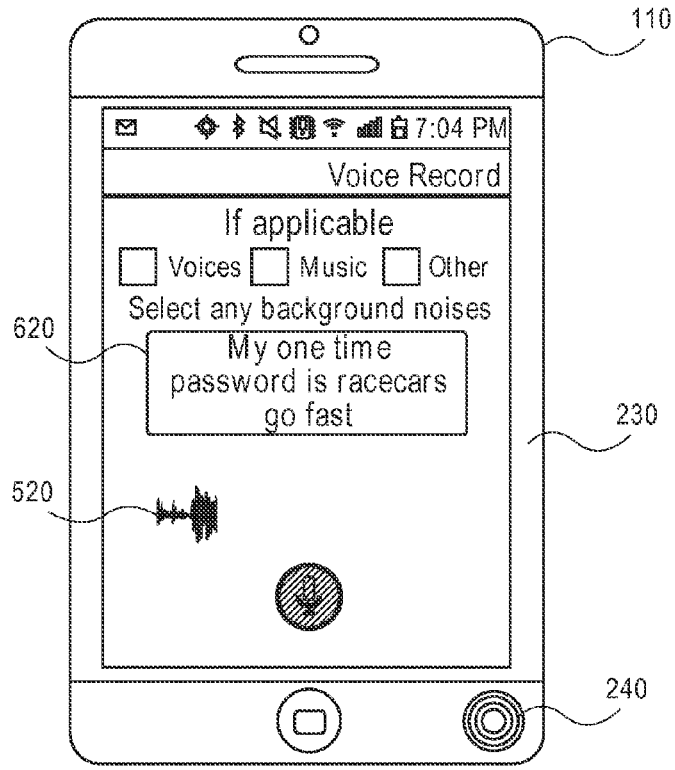
FIG. 6B shows a screenshot of speaker verification on a communication device using a second prompt, according to an embodiment of the present invention.

FIG. 6B shows a screenshot of speaker verification on a communication device using a second prompt 620, according to an embodiment of the present invention. FIG. 6B illustrates a scenario of a user 401 (FIG. 4) attempting to authenticate in an instance different than that in FIG. 6A. The second prompt 620 is different from first prompt 610 in FIG. 6A. As described above, each authentication attempt by the user 401 (FIG. 4) may require the user to repeat a different prompt. However, a majority of the words in each prompt may be fixed for purposes of increased user experience. The prompt 620 of FIG. 6B requests the user to speak "My one time password is racecars go fast." The words "My one time password" are the same in FIG. 6B and in FIG. 6A, and are the fixed words in the authentication prompt 620. The words "racecars go fast" is the random element in the prompt 620 and may change upon each authentication attempt by the user 401 (FIG. 4). In some embodiments, the user 401 (FIG. 4) may be presented with a progressive feedback indicator 520 indicating progress towards capturing the user's voice for authentication.

Figure 7:
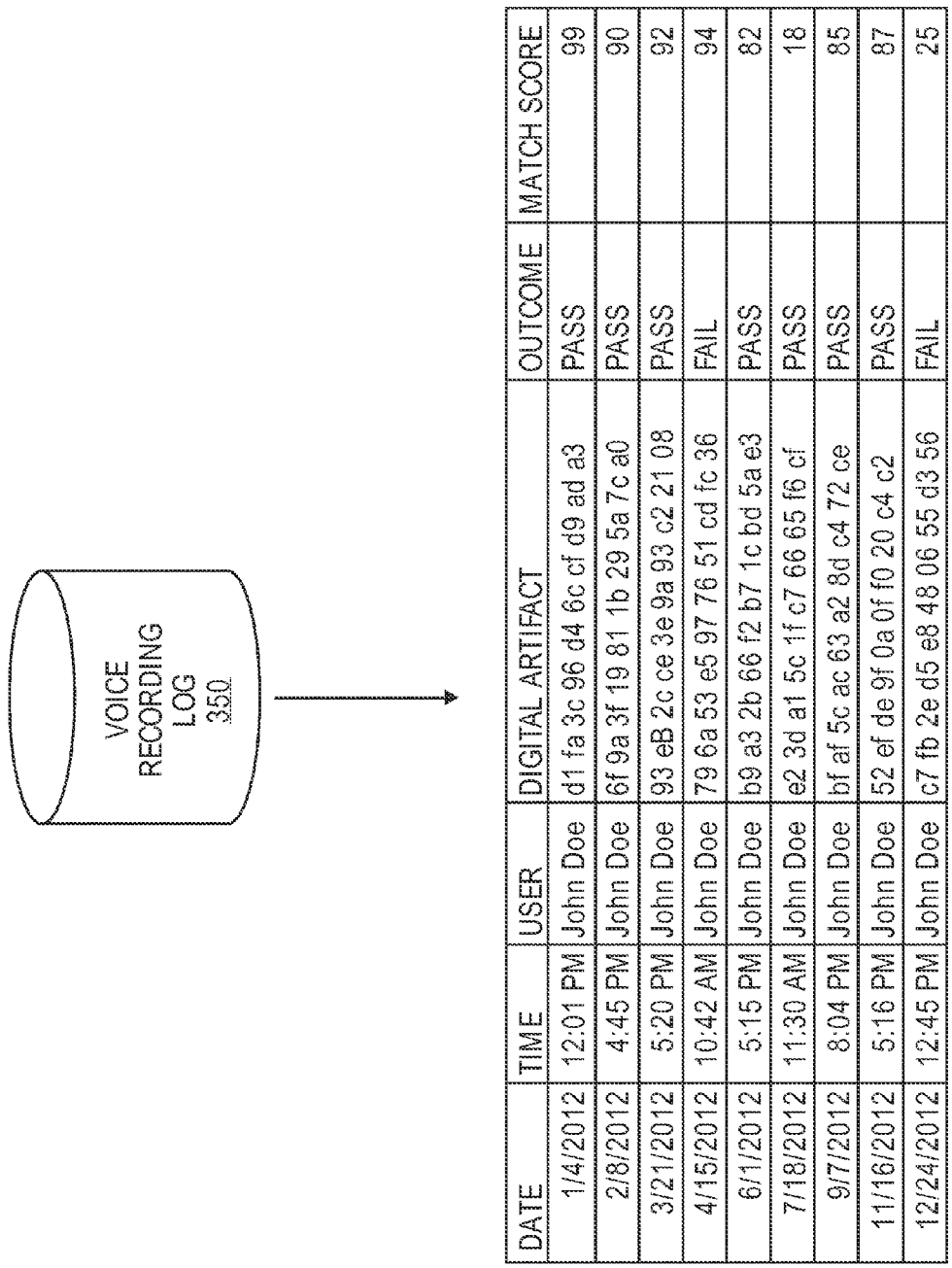
FIG. 7 illustrates a user voice recording log stored within a database, according to an embodiment of the present invention.

FIG. 7 illustrates a user fraud profile 450 stored within a database, according to an embodiment of the present invention. In some embodiments, the user fraud profile 450 may be stored within a database on the voice biometric matching server 300 (FIG. 4). The user fraud profile 450 is configured to store a fraud profile of a user 410 (FIG. 1). The fraud profile of the user may include attributes such as, but not limited to, initiation date of the payment transaction, initiation time of the payment transaction, the payment user's name, the captured voice data used for verification and associated with the payment transaction, the outcome of payment user verification/authentication, and a variable match score for the user.

FIG. 7 shows data sets relating to nine different payment authorization requests for a user named "John Doe." Each of the nine payment authorization request data sets includes the attribute information mentioned above.

The date attribute of the user fraud profile 450 indicates the date at which a user initiated a payment transaction using the communication device 110 (FIG. 4). In this example, the first recorded date (Jan. 4, 2012) indicates the first payment transaction initiated by the user after initially enrolling with the communication device 110 (FIG. 4). Each subsequent date represents a subsequent payment transaction initiated by the user.

The time attribute of the user fraud profile 450 indicates the time of day on the date at which the user initiated the particular payment transaction.

The user attribute of the user fraud profile 450 indicates the registered name for the genuine user. In this example, the registered name, "John Doe" is the same for every payment authorization request. It can be appreciated that the user fraud profile database 450 stores the recorded payment authorization requests for each user in a unique location within the database. Other locations within the database, not shown in this example, may contain fraud profiles for other users having a different name.

The voice data of the user fraud profile 450 is the captured digital representation of the voice signal by the communication device 110 (FIG. 1) upon voice authentication of the user that is then sent to the voice biometric matching server 300 (FIG. 4). As mentioned above, the voice data for each individual payment transaction request initiated by the user is unique as is the requested prompt.

FIG. 7 shows nine different captured voice data representations for each of the nine payment transactions initiated by the user "John Doe." As shown, each of the voice data representations is unique. Since it is highly unlikely that each received voice data representation from the user will be identical every time, the voice data representations are unique for each transaction. For example, it is highly unlikely that a user speaks in the same tone for the voice biometric every time or that the requested voice prompt is the same every time.

In FIG. 7, a first voice data representation (stored on Jan. 4, 2012) is the generated value upon a user performing their first payment authorization request after registering with the consumer device 110 (FIG. 1). A second voice data representation is the generated value on a subsequent payment authorization request. If a received voice data representation is significantly different than previously received and stored voice data representations in the voice recording log database 450, the received voice data representation may be assigned a relatively low match score and the payment transaction request may be denied for possible fear of a fraudster wishing to initiate the payment transaction request.

As more voice data representations are received and stored, more comparison points for subsequently received voice data representations are available. For example, the ninth received voice data representation (Dec. 24, 2012) may be compared against the previous eight stored voice data representations in order to determine its match score. Also, the voice data representations are used to create a voice model for the user. Each subsequent voice data representation received improves the user's voice model.

The outcome attribute of the user fraud profile 450 indicates the outcome of the validation of the voice data representation. If it is determined that the received voice data representation is an accurate reproduction of the requested prompt, a passing outcome will be stored in the user fraud profile and a pass response will be transmitted from the voice biometric matching server 300 (FIG. 4) to the payment processor network 140 (FIG. 4). If it is determined that the received voice data representation is not an accurate reproduction of the requested prompt, a failing outcome will be stored in the user fraud profile and a fail response will be transmitted from the voice biometric matching server 300 (FIG. 4) to the payment processor network 140 (FIG. 4). As described above, the prompt reproduction determination module 368 (FIG. 3) is configured to determine the pass or fail outcome based on whether an accurate voice data reproduction of the prompt was received.

As mentioned above, the match score attribute of the user fraud profile 450 indicates a match score associated with how closely a newly received voice data representation matches to previously stored voice data representations. In this example, the match score may be on a scale from 0-100, with 100 being the highest (most risk). As described above, the match score module 366 (FIG. 3) is configured to determine the match score. It can be appreciated that the outcome attribute may still be a PASS even though the match score for a particular voice data representation is low. This indicates that the user reproduced the requested prompt accurately, but their voice did not closely match to previously stored voice data representations. In some embodiments, a transaction may only be approved if both the outcome is a PASS and the match score is high.

As demonstrated in FIG. 7, the match score varies for each subsequent payment transaction request initiated by user "John Doe." With the exception of the first received voice data representation having the highest match score of 99 because it is the first received voice data representation used for initial enrollment by the user. Each subsequent received and validated voice data representation results in a different match score depending on how close the match is. The determination of the match score may be determined based on a predetermined formula. The match score may be an indication of how risky approving the payment transaction may be.

II. Exemplary Methods

Figure 8:
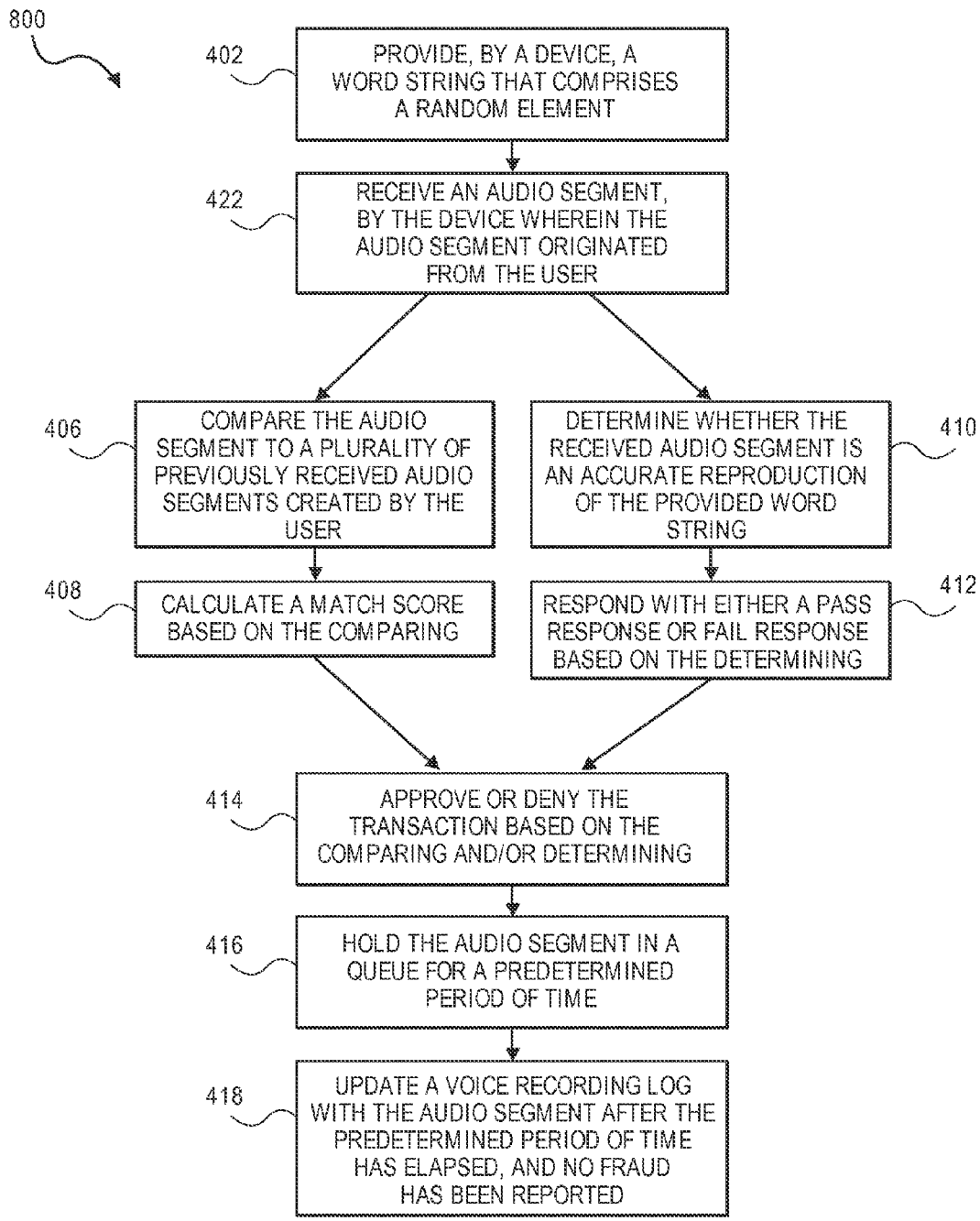
FIG. 8 is a flow diagram illustrating a method for authenticating a user for a transaction at a communication device, according to an embodiment of the present invention.

FIG. 8 is a flow diagram illustrating a method 800 for authenticating a user for a transaction at a communication device, according to an embodiment of the present invention. The method 800 is performed by processing logic that may comprise hardware (circuitry, dedicated logic, etc.), software (such as is run on a general purpose computing system or a dedicated machine), firmware (embedded software), or any combination thereof. In certain embodiments, the method 800 is performed by the server computer 300 of FIG. 3. The steps of method 800 correspond to the steps in the flow diagram of FIG. 4.

The method includes providing, by a device, a word string that includes a random element (step 402). For example, in FIG. 6A, the communication device may provide the user with a word string having the randomized element (e.g., "socks keep warm") and a request for the cardholder to reproduce the entire word string (e.g., "My password is socks keep warm"). The communication device 110 may further provide an option to filter out any background noises while the user is attempting to reproduce the word string.

After providing, to the user 401, a word string having a random element, the method performed continues by receiving an audio segment by the device 110 wherein the audio segment originated from the user 401 (step 404). For example, in FIG. 4, the voice biometric matching server 300 receives a captured audio segment from the communication device 110 via the payment processor network 140. Note that the payment processor network 140 could alternatively be an issuer computer, a merchant computer, an acquirer computer, etc. The audio segment is the user's attempt to reproduce the randomized word string.

After receiving the audio segment from the user 401 that attempts to reproduce the word string, the method (e.g., by the voice biometric matching server 300) compares the audio segment to a plurality of previously received audio segments created by the user 401 (step 406) and determines whether the received audio segment is an accurate reproduction of the provided word string (step 410). In some embodiments, the audio segments may be compared to a model generated based on the previously received audio segments. It can be appreciated that step 406 and step 410 may either be performed in parallel or sequentially. For example, in FIG. 4, the voice biometric matching server 300 compares the received audio segment to previously stored audio segments from the user and also determines whether the received audio segment is an accurate reproduction of the provided word string displayed on the communication device 110.

After comparing the received audio segment to previously stored audio segments of the user 401, the method calculates a match score based on the comparing (step 408). The match score may be between 1-100 and may indicate how closely the elements of the received audio segment match with elements of the previously stored audio segments of the user. For example, in FIG. 4, the voice biometric authentication server 300 determines a match score of the received audio segment from the communication device 110 via the payment processor network 140. After determining whether the received audio segment is an accurate reproduction of the word string, the method (conducted by the voice biometric matching server 300) responds with either a pass response or fail response based on the determining (step 412). A pass response indicates an accurate reproduction of the word string while a fail response does not. For example, in FIG. 4, the voice biometric authentication server 300 responds to the payment processor network 140 with a pass response or fail response based on the received audio segment from the communication device 110 via the payment processor network 140.

After the voice biometric matching server 300 calculates a match score and responding with a pass or fail response, the method continues by approving or denying the transaction based on the comparing and/or determining (step 414). For example, in FIG. 4, the voice biometric matching server may approve or deny a payment transaction based on the calculated match score and determination of the pass/fail response which are both ultimately based on the received audio segment from the user.

After approving or denying the transaction, the method continues by holding the received audio segment in a queue for a predetermined period of time (step 416). The queue may reside within the voice biometric matching server 300. For example, in FIG. 4, the audio segment received by the voice biometric matching server 300 is stored in the temporary voice data queue which resides within the voice biometric matching server 300. The predetermined period of time may be a day, a week, a month, or any other suitable predetermined time period. In some embodiments, the predetermined time is a time less than about one month, two weeks, or 5 days.

After holding the audio segment in the queue for a predetermined period of time, the method continues by updating a fraud model (e.g., by the voice biometric matching server 300) with the audio segment after the predetermined period of time has elapsed, and no fraud has been reported (step 418). By waiting until the predetermined period of time has expired prior to updating the fraud model with the audio segment, it can be ensured that the audio segment is of the genuine user's since no fraud has been reported within the predetermined time period. For example, if the predetermined time period is a month, and no fraud has been reported for the particular transaction in that month, the audio segment associated with the transaction may be stored in the fraud model for the user. In an example, in FIG. 4, after the predetermined period of time has elapsed, the audio segment may be released from "pending" status and forwarded from the temporary voice data queue to the fraud model for updating the user's fraud model. As more and more audio segments are received by the voice biometric matching server, the fraud model for the cardholder becomes more complete and may be used for future evaluation of audio segments from the cardholder.

It should be appreciated that the specific steps illustrated in FIG. 8 provide a particular method for authenticating a user for a transaction at a communication device using speaker verification, according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple substeps that may be performed in various sequences as appropriate to the individual step. Furthermore, additional steps may be added or removed depending on the particular applications. One of ordinary skill in the art would recognize and appreciate many variations, modifications, and alternatives of the method 800.

Figure 9:
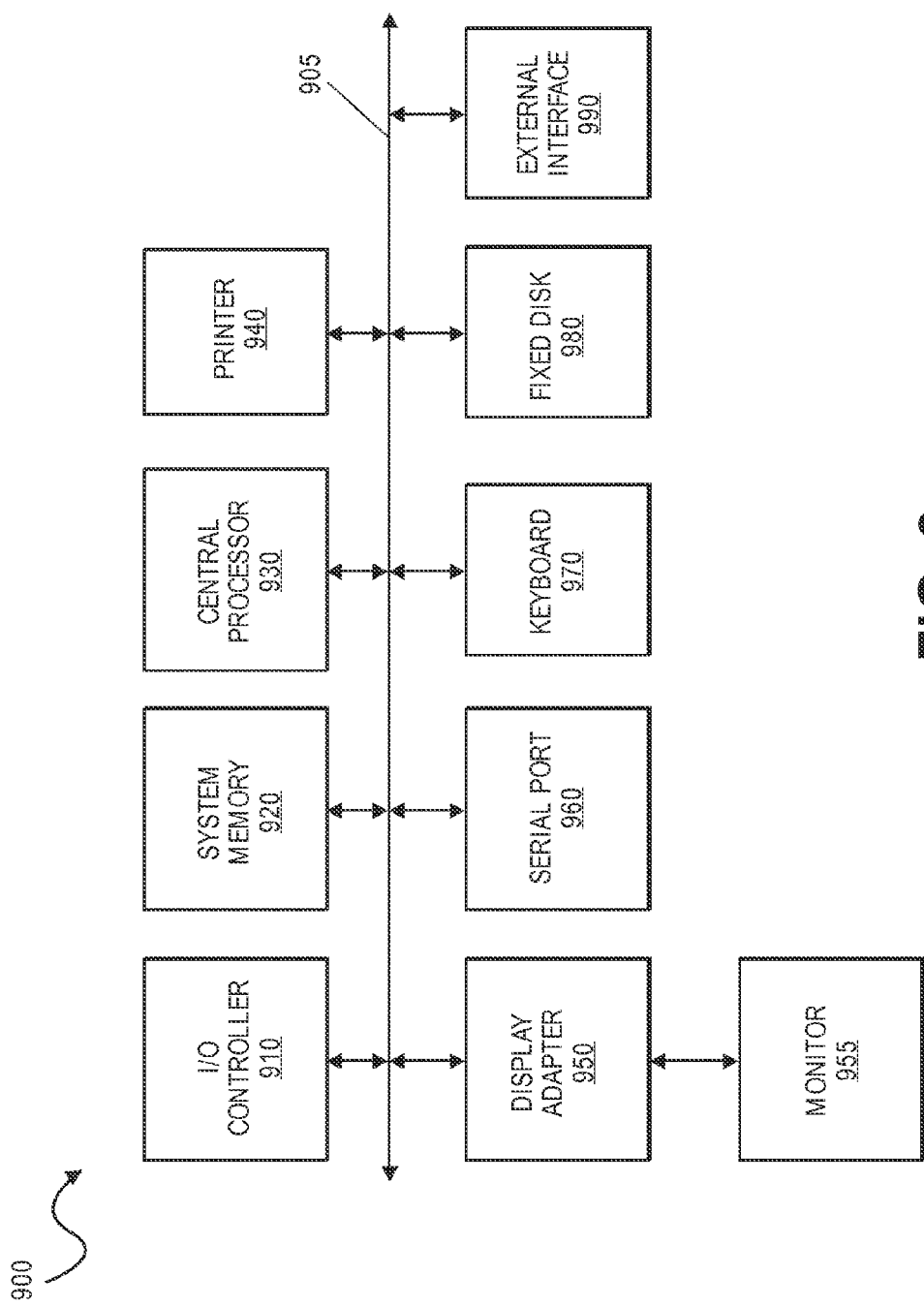
FIG. 9 is a diagram of a computer apparatus, according to an example embodiment.

FIG. 9 is a diagram of a computer apparatus 900, according to an example embodiment. The various participants and elements in the previously described system diagram (e.g., the communication device, payment processing network, acquiring bank, issuing bank, etc., in FIG. 1 or the server computer in FIG. 3) may use any suitable number of subsystems in the computer apparatus to facilitate the methods and/or functions described herein. Examples of such subsystems or components are shown in FIG. 9. The subsystems shown in FIG. 9 are interconnected via a system bus 905. Additional subsystems such as a printer 940, keyboard 970, fixed disk 980 (or other memory comprising computer-readable media), monitor 955, which is coupled to display adapter 950, and others are shown. Peripherals and input/output (I/O) devices (not shown), which couple to I/O controller 910, can be connected to the computer system by any number of means known in the art, such as serial port 960. For example, serial port 960 or external interface 990 can be used to connect the computer apparatus to a wide area network such as the Internet, a mouse input device, or a scanner. Alternatively, peripherals can be connected wirelessly (e.g., IR, Bluetooth, etc.). The interconnection via system bus allows the central processor 930 to communicate with each subsystem and to control the execution of instructions from system memory 920 or the fixed disk 980, as well as the exchange of information between subsystems. The system memory 920 and/or the fixed disk 980 (e.g., hard disk, solid state drive, etc.) may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

One or more embodiments of the invention may be combined with one or more other embodiments of the invention without departing from the spirit and scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for authenticating a user for a transaction, comprising:
providing, by a device, a word string that comprises a random element;
receiving an audio segment, by the device, wherein the audio segment originated from the user;
authenticating the user for the transaction based at least in part on the received audio segment;
approving the transaction when the received audio segment matches previously stored voice samples of the user;
holding the audio segment in a queue for a predetermined period of time after approving the transaction;
delaying updating of a fraud model with the audio segment being held in the queue until after the predetermined period of time has elapsed; and
updating the fraud model with the audio segment when no fraud has been reported for the predetermined period of time.

2. The method of claim 1 further comprising:
comparing the audio segment to a plurality of previously received audio segments created by the user or a model generated based on the previously received audio segments; and
calculating a match score based on the comparing.

3. The method of claim 2 further comprising approving or declining the transaction based on the match score.

4. The method of claim 1 further comprising:
determining whether the received audio segment is an accurate reproduction of the provide word string; and
responding with either a pass response or a fail response based on the determining.

5. The method of claim 1 wherein the word string is seven words or less.

6. The method of claim 1 wherein the device is a voice biometric matching server.

7. The method of claim 1 wherein the fraud model is based on a plurality of audio segments received from the user.

8. The method of claim 1 wherein the updating further comprises updating a cardholder trust level.

9. The method of claim 1 wherein the random element is preceded by a fixed element of the word string.

10. The method of claim 9 wherein the fixed element is greater than the random element.

11. A device, comprising:
a processor; and
a non-transitory computer-readable storage medium, comprising code executable by the processor for implementing a method for authenticating a user for a transaction, the method comprising:
providing, by a device, a word string that comprises a random element;

receiving an audio segment, by the device, wherein the audio segment originated from the user;

authenticating the user for the transaction based at least in part on the received audio segment;

approving the transaction when the received audio segment matches previously stored voice samples of the user;

holding the audio segment in a queue for a predetermined period of time after approving the transaction;

delaying updating of a fraud model with the audio segment being held in the queue until after the predetermined period of time has elapsed; and updating the fraud model with the audio segment when no fraud has been reported for the predetermined period of time.

12. The device of claim 11, wherein the method further comprises:

comparing the audio segment to a plurality of previously received audio segments created by the user or a model generated based on the previously received audio segments; and calculating a match score based on the comparing.

13. The device of claim 12, wherein the method further comprises approving or declining the transaction based on the match score.

14. The device of claim 11, wherein the method further comprises:

determining whether the received audio segment is an accurate reproduction of the provided word string; and responding with either a pass response or a fail response based on the determining.

15. The device of claim 11 wherein the word string is seven words or less.

16. The device of claim 11 wherein the device is a voice biometric matching server.

17. The device of claim 11 wherein the fraud model is based on a plurality of audio segments received from the user.

18. The device of claim 11 wherein the updating further comprises updating a cardholder trust level.

19. The device of claim 11 wherein the random element is preceded by a fixed element of the word string.

20. The device of claim 19 wherein the fixed element is greater than the random element.

21. The method of claim 1 wherein the predetermined period of time is at least one day.

22. The device of claim 11 wherein the predetermined period of time is at least one day.

* * * * *